United States Patent
Chen et al.

(10) Patent No.: US 10,417,343 B2
(45) Date of Patent: Sep. 17, 2019

(54) DETERMINING SAFETY RISK USING NATURAL LANGUAGE PROCESSING

(71) Applicant: Uber Technologies, Inc., San Francisco, CA (US)

(72) Inventors: Li Chen, Daly City, CA (US); Yi-Chia Wang, San Bruno, CA (US); Qi Dong, Mountain View, CA (US)

(73) Assignee: Uber Technologies, Inc., San Francisco, CA (US)

( * ) Notice: Subject to any disclaimer, the term of this patent is extended or adjusted under 35 U.S.C. 154(b) by 0 days.

(21) Appl. No.: 16/172,658

(22) Filed: Oct. 26, 2018

(65) Prior Publication Data

US 2019/0065473 A1 Feb. 28, 2019

Related U.S. Application Data

(63) Continuation of application No. 15/478,184, filed on Apr. 3, 2017, now Pat. No. 10,146,769.

(51) Int. Cl.
*G06Q 10/06* (2012.01)
*G06F 17/27* (2006.01)

(52) U.S. Cl.
CPC ................... *G06F 17/2785* (2013.01)

(58) Field of Classification Search
CPC ......... G06Q 10/06; G06Q 40/00; H04L 29/08
See application file for complete search history.

(56) References Cited

U.S. PATENT DOCUMENTS

| | | | |
|---|---|---|---|
| 8,731,770 B2 | 5/2014 | Fischer | |
| 9,477,639 B2 | 10/2016 | Fischer et al. | |
| 2005/0086191 A1* | 4/2005 | Werner | G06F 16/951 |
| 2011/0301985 A1 | 12/2011 | Camp et al. | |
| 2017/0041737 A1 | 2/2017 | Fischer | |
| 2017/0124506 A1 | 5/2017 | Khan | |
| 2017/0200321 A1 | 7/2017 | Hummel et al. | |
| 2017/0305434 A1 | 10/2017 | Ratnasingam | |
| 2018/0089605 A1* | 3/2018 | Poornachandran | G06Q 10/06393 |
| 2018/0124207 A1* | 5/2018 | Marueli | H04L 67/18 |

* cited by examiner

*Primary Examiner* — Shreyans A Patel
(74) *Attorney, Agent, or Firm* — Fenwick & West LLP

(57) ABSTRACT

A network system coordinates users who provide geographical location-based services to users. Users can provide textual feedback regarding the services provided by other users. To create a safe user experience and encourage users to continue using the services, the network system determines safety risks of the users by analyzing the textual feedback from users along with metadata associated with the textual feedback. For example, the network system determines a safety score for a user based on classifying textual feedback according to different types of safety risk related to topics such as vehicle operation or interpersonal behavior. The network system can train classifiers using feature vectors derived from textual feedback previously received from users of the network system, which may be labeled in a supervised training process. The network system may provide interventions to high-risk users to help mitigate their safety risk and prevent safety incidents from occurring.

20 Claims, 8 Drawing Sheets

310

DETERMINING SAFETY RISK USING NATURAL LANGUAGE PROCESSING

CROSS REFERENCE TO RELATED APPLICATION

This application is a continuation of U.S. application Ser. No. 15/478,184 filed Apr. 3, 2017, which is herein incorporated in its entirety by reference.

BACKGROUND

1. Field of Art

The present disclosure generally relates to determining safety risks of users of a network system, and more specifically to using natural language processing and various types of classifiers to determine the safety risks.

2. Description of the Related Art

Natural language processing techniques can be used to determine characteristics of a string of text. For example, a sentence including the words "cats" and "dogs" is likely to be relevant to the topic of pets. However, the sentence "it's raining cats and dogs" includes both of those words, but is not relevant to the topic of pets. Instead, the sentence refers to an English idiom. Thus, it is challenging to determine the topic of a sample of text due variations in context.

In a system, providers provide services to users, for example, the provider uses a vehicle to transport the user for a trip. If the users perceive the providers as unsafe (e.g., driving recklessly or being confrontational), the users may stop using the system's services. Users can provide textual feedback to the system to report incidences of unsafe behavior, but automatic and systematic analysis of this textual feedback to determine provider characteristics and level of safety risks has proven challenging. Without such an automated way, subjective human techniques may be applied that are expensive to implement and rely on the subjective considerations of individual reviewers. It would be desirable for the system to automatically analyze the textual feedback to determine whether providers are safe or unsafe, and for the system to handle submissions of the textual feedback at a large scale.

SUMMARY

In one embodiment, a method comprises receiving, by a network system from a client device of a user, textual feedback associated with metadata and a provider. The textual feedback includes a set of words. The metadata describes the contexts of the textual feedback. The network system determines a feature vector for the textual feedback by characterizing the set of words and the metadata. There are multiple subcategories of safety risk. The network system determines a first safety sub-score by applying the feature vector to a first classifier associated with a first subcategory of safety risk. The network system determines a second safety sub-score by applying the feature vector to a second classifier associated with a second subcategory of safety risk different than the first subcategory of safety risk. After determining sub-scores for all subcategories, the network system determines an overall safety score for the provider using another classifier based, at least in part, on the safety sub-scores.

The figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

A network system coordinates providers who provide geographical location-based services to users. The location-based services may include transportation of users in a vehicle. Users can provide textual feedback regarding the services provided by the providers. To create a safe user experience and encourage users to continue using the services, the network system determines safety risks of the providers by analyzing the textual feedback from users along with metadata associated with the textual feedback. For example, the network system determines a safety score for a provider based on classifying textual feedback according to different types of safety risk related to topics such as vehicle operation or interpersonal behavior. Each safety risk classifier may generate its own score representing a level of risk related to the corresponding type of safety risk. The individual scores may be combined with the metadata by an ensemble classifier to determine the likelihood of an overall safety risk of a provider. The network system may provide interventions to high-risk providers to help mitigate their safety risk and prevent safety incidents from occurring.

I. System Overview

Figure 1:
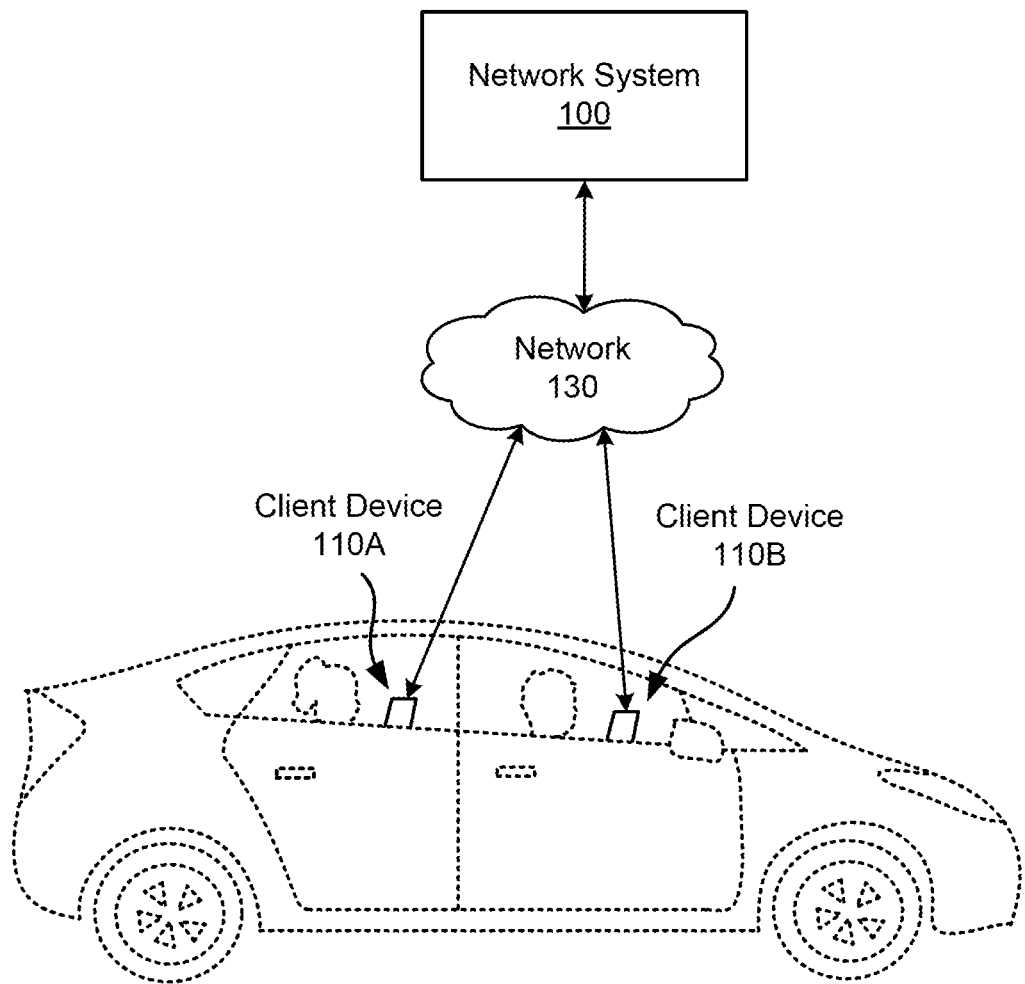
FIG. 1 is a diagram of a system environment for a network system according to one embodiment.

FIG. 1 is a diagram of a system environment for a network system 100 according to one embodiment. Users of the network system 100 may include providers that provide service to other users. In an example use case, a provider operates a vehicle to transport a user from a first location (e.g., an origin or pickup location) to a second location (e.g., a drop-off location). Other types of service include, for example, delivery of goods such as mail, packages, or consumable items.

The system environment includes the network system 100 and one or more client devices 110 of users of the network system 100, for example, client device 110A of a user and client device 110B of a provider providing service to the user, which may collectively be referred to herein as a "client device 110" or "client devices 110." The various systems shown in FIG. 1 are connected to each other via a network 130. In other embodiments, different and/or additional entities can be included in the system architecture. The functions performed by the various entities of FIG. 1 may vary in different embodiments. The network system 100 determines safety risks of providers based on feedback from users.

A user can interact with the network system 100 through the client device 110, e.g., to request transportation or to receive requests to provide transportation. A client device 110 can be a personal or mobile computing device, such as a smartphone, a tablet, or a notebook computer. In some embodiments, the client device 110 executes a client application that uses an application programming interface (API) to communicate with the network system 100 through the network 130. The client application of the client device can present information received from the network system 100 on a user interface, such as a map of the geographic region and the current location of the client device 110. The client application running on the client device 110 can determine the current location using a location sensor of the client device 110, such as a global positioning system (GPS) receiver, and provide the current location to the network system 100.

In one embodiment, through operation of the client device 110, a user makes a trip request to the network system 100. For example, the trip request may include user identification information, the number of passengers for the trip, a requested type of the service provider (e.g., a vehicle type or service option identifier), the current location and/or the origin location (e.g., a user-specific geographical location for pickup, or a current geographical location of the client device 110), and/or the destination for the trip. The user may also input feedback via a user interface of the client device 110. For example, the user inputs textual feedback using a touchscreen keyboard of the client device 110. Depending on implementation, before, during, or after the trip, the client device 110 can provide the feedback to the network system 100.

In some embodiments, a provider uses a client device 110 to interact with the network system 100 and receive invitations to provide service for users. For example, the provider is a person operating a vehicle capable of transporting users. In some embodiments, the provider is an autonomous vehicle that receives routing instructions from the network system 100. For convenience, this disclosure generally uses a car as the vehicle, which is operated by a driver as an example provider. However, the embodiments described herein may be adapted for a provider operating alternative vehicles (e.g., boat, airplane, helicopter, etc.) or vehicles that do not necessarily need to be operated by a person.

In some embodiments, a provider can receive invitations or assignment requests through a client device 110. An assignment request identifies a user who submitted a trip request to the network system 100 and determines the origin location and/or the destination location of the user for a trip. For example, the network system 100 can receive a trip request from a client device of a user, select a service provider from a pool of available (or "open") providers to provide the trip, e.g., based on the vehicle type, determined origin location, and/or the destination location. The network system 100 transmits an assignment request to the selected provider's client device 110.

Client devices 110 can communicate with the network system 100 via the network 130, which may comprise any combination of local area and wide area networks employing wired or wireless communication links. In one embodiment, the network 130 uses standard communications technologies and/or Internet protocols. For example, the network 130 includes communication links using technologies such as the Internet, 3G, 4G, BLUETOOTH®, or WiFi. In some embodiments, all or some of the communication links of the network 130 may be encrypted.

The client devices 110 may provide textual feedback, in response to user input, as safety tickets to the network system 100. For example, a safety ticket includes a user's feedback that describes a provider's unsafe vehicle operation during a service. It is challenging to process all of the textual feedback manually at large scale. However, the network system 100 can automatically analyze the textual feedback to determine whether providers are safe or unsafe. In particular, the network system 100 may use various classifiers to determine safety risks of providers.

II. Example System Architecture

Figure 2:
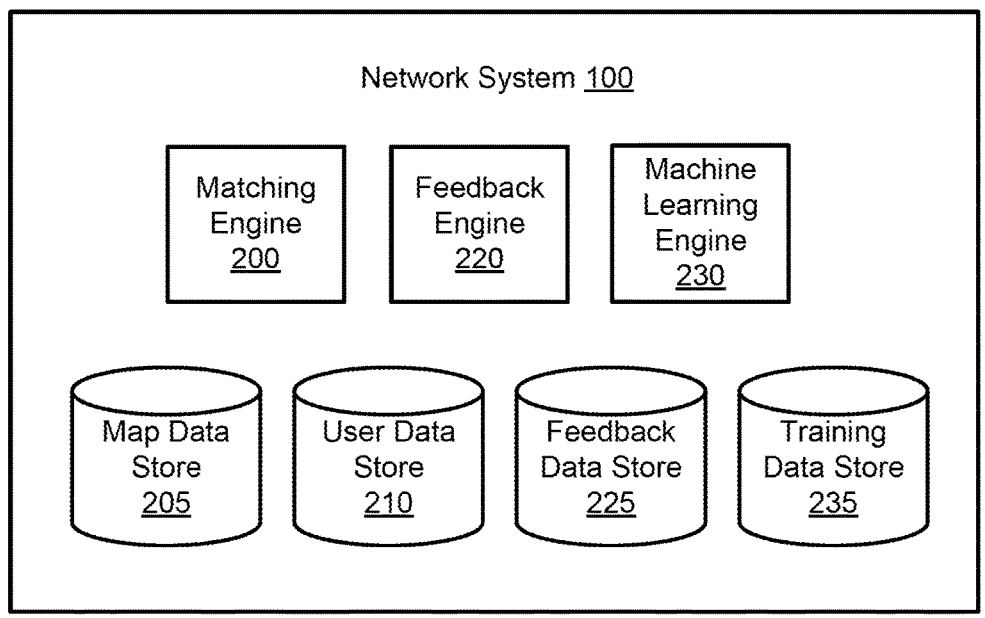
FIG. 2 is a block diagram illustrating the architecture of the network system according to one embodiment.

FIG. 2 is a block diagram illustrating the architecture of a network system 100 according to one embodiment. The network system 100 includes a matching engine 200, map data store 205, user data store 210, feedback engine 220, feedback data store 225, machine learning engine 230, and training data store 235. In other embodiments, the network system 100 may include additional, fewer, or different components for various applications. Conventional components such as network interfaces, security functions, load balancers, failover servers, management and network operations consoles, and the like are not shown as to not obscure the details of the system architecture.

In some embodiments, users and/or providers use their client devices 110 to register with the network system 100, for example, by creating accounts and providing user information (e.g., contact information, a home or office address, or billing information) to the network system 100. The network system 100 stores the user information in the user data store 210. The network system 100 can associate feedback received from a user or data from trips taken by the user with the registered account of the user and/or the provider.

The matching engine 200 selects providers to service the requests of users. For example, the matching engine 200 receives a trip request from a user and determines a set of candidate providers that are online, open (e.g., are available to transport a user), and near the requested origin (pickup) location for the user, e.g., based on map information from a data source. The matching engine 200 selects a provider from the set of candidate providers to which it transmits an assignment request. The provider can be selected based on the provider's location, the origin and/or destination location, the type of the provider, the amount of time the provider has been waiting for an assignment request and/or the destination of the trip, among other factors.

The map data store 205 stores map information of geographic regions in which the network system 100 offers services such as transportation for users. The map information may include map properties of a geographical region such as road properties that describe characteristics of the road segments, such as speed limits, road directionality (e.g., one-way or two-way), traffic history, traffic conditions, addresses on the road segment, length of the road segment, and type of the road segment (e.g., surface street, residential, highway, toll). The map properties also can include properties about intersections, such as turn restrictions, light timing information, throughput, and connecting road segments.

The feedback engine 220 receives feedback from client devices 110 of a user of the network system 100. According to examples, feedback data for a trip can include or be associated with textual feedback, a rating or score (e.g., a number of stars out of five stars), an identifier of the user, an identifier of the provider, an identifier of the request or service, or other user-specified content (e.g., a selection of options or criteria the user liked or disliked). In some embodiments, the feedback engine 220 converts non-textual feedback into a textual feedback for further processing. For example, feedback indicating a sentiment may be converted into "satisfied," "unsatisfied," "negative," "neutral," or "positive." As another example, the feedback engine 220 uses speech-to-text algorithms to convert audio feedback recorded by an audio sensor of the client device 110 into textual feedback. Additionally, the feedback engine 220 may use image-processing techniques to identify one or more objects shown in a photo captured by a camera of client device 110 of a user, and determine textual feedback associated with the identified objects. For example, the feedback engine 220 determines text representing the license plate number from a photo of the license plate.

The feedback engine 220 can receive metadata associated with feedback. Metadata describes context of feedback not necessarily provided by text included in the feedback. For example, the metadata is based on historical actions of a user or provider of the network system 100 such as a number of services that the user has received from providers or that the provider has provided to users for a given duration of time, a number of incidents that occurred during the services, or certain categories of safety risk associated with the incidents (e.g., which may be retrieved from the user data store 210).

In other examples, the metadata is based on information for a particular service. For instance, for a particular trip, the metadata indicates the trip duration or distance traveled, the origin or destination location of the trip, the location of a client device 110 when feedback was submitted, or telematics data captured by a client device 110 of the user or provider during the trip. Metadata may be associated with interactions performed for a service, for example, whether the user communicated with a provider during a trip (e.g., to determine a pick up location for the user to meet with the provider), or whether the user communicated with personnel of the network system 100 (e.g., because the user experienced difficulties to request the service or during the provided service). Metadata may describe information regarding the submission of the textual feedback. For example, the metadata indicates whether the textual feedback was submitted by a user or provider, or a submission channel (e.g., email, text message, user interface button, or client application).

The feedback engine 220 analyzes textual feedback received from users to generate feature vectors that characterize the textual feedback. For instance, the feature vectors quantize the linguistic context of words included in the textual feedback. Additionally, the feature vectors represent the textual feedback using any number of dimensions in latent dimension space. Thus, feature vectors of textual feedback having words with similar linguistic context will be closer to each other in the latent dimension space. Comparison of feature vectors is further described below with reference to FIGS. 3A-B. The feedback engine 220 may store feature vectors and other types of training data in the training data store 235. The training data store 235 may include the map data store 205, user data store 210, and/or feedback data store 225, in some embodiments.

To generate the feature vectors, the feedback engine 220 may use different types of statistical models and natural language processing (NLP) techniques, for example, lexical analysis, syntactic analysis, semantic analysis, synonyms, bag-of-words, information retrieval, sentiment analysis, stemming, fuzzy matching, anaphora resolution, word2vec (e.g., latent vector embedding), linear discriminant analysis (LDA), and/or other types of topic modeling features. The feedback engine 220 identifies words and phrases included in textual feedback by determining a number of n-grams of the textual feedback. The n-grams may be determined based on an identified language of the textual feedback (e.g., English, Chinese, Spanish, etc.). The feedback engine 220 can also generate feature vectors that characterize metadata associated with the textual feedback. Unlike textual feedback that may be language dependent, metadata may be independent across different languages.

The feedback engine 220 uses information retrieval techniques such as determining a term frequency-inverse document frequency (TF-IDF) for a word or phrase in textual feedback, in some embodiments. Generally, a word that occurs more frequently in textual feedback is more relevant to the topic of the textual feedback. For example, if textual feedback includes five occurrences of the word "speeding" and one occurrence of the word "office," then the data source is more likely relevant to speeding, rather than to an office. However, words including conjunctions such as "and", "but", and "or," as well as antecedents such as "a" and "the" typically occur frequently in textual feedback regardless of the topic. To account for these types of words, a TF-IDF technique considers the occurrence of these words in a corpus, e.g., a large collection of textual feedback or types of textual documents. As an example, for a given textual feedback, the feedback engine 220 determines the relevance for a word based on comparing the number of occurrences of the word in the given textual feedback with another number of occurrences of the word in the corpus.

The feedback engine 220 can determine linguistic context based on the occurrence of a particular combination of two or more words in textual feedback. As an example, the word "swerving" can occur in textual feedback, such as "the car was swerving on the snowy road" or "the driver was not familiar with the roads so we were swerving around," and the word "drunk" can occur in textual feedback, such as "my friend was drunk so I helped her home" or "I lost my keys since I was so drunk." In a collection of textual feedback, the word "swerving" can occur on average 0.1 times per textual feedback and the word "drunk" can occur on average 0.05 times per textual feedback. Additionally, the words "swerving" and "drunk" can occur together on average 0.001 times per textual feedback. Because the likelihood of these two words occurring together is much less (e.g., by at least an order of magnitude) than the likelihood of each word occurring individually per textual feedback, the feedback engine 220 determines that the combined occurrence is a strong indicator of a topic of the textual feedback.

Following in the example above, the feedback engine 220 determines that a sample textual feedback "the driver was swerving a lot and I think he his driving too fast" is likely relevant to the topic of aggressive driving. Accordingly, a feature vector characterizing the sample textual feedback generated by the feedback engine 220 will indicate that the context of the sample textual feedback is strongly matches the topic of aggressive driving. For instance, if the feature vector uses numerical values to represent latent space dimensions each associated with a topic, the dimension corresponding to the topic of aggressive driving will have greater magnitude value than that of other dimensions corresponding to topics such as "friendly personality" or "physical altercation."

In some embodiments, the feedback engine 220 generates feature vectors characterizing a series of textual feedback, along with any suitable metadata associated with the textual feedback. For instance, in response to receiving the sample textual feedback "the driver was swerving a lot and I think he his driving too fast," the network system 100 provides a message (e.g., for display on a client device 110) to the user submitting the sample textual feedback asking the question "About what is the average speed of the vehicle?" In response to the question, the user submits the follow-up textual feedback "80 miles per hour" or "80 mph." Thus, the resulting feature vector characterizes the sample textual feedback, the message with the question, and the follow-up textual feedback. The metadata may include telematics data captured using the user's client device 110 indicating that the driver was harshly accelerating and braking.

As another example of how the feedback engine 220 can determine linguistic context based on semantic analysis of two or more words, the feedback engine 220 determines that the textual feedback "he hit me with his hand and it hurt" is related to the topic of "physical altercation." An example textual feedback including the word "hit" is "the driver's music hit the spot," an example textual feedback including the word "hand" is "he gave me a hand with my grocery bags," and an example textual feedback including the word "hurt" is "my feet hurt so much from walking—glad I got a ride!" Each of these three example textual feedback are not related to the topic of "physical altercation." However, the feedback engine 220 determines that the occurrence of each of the words "hit," "hand," and "hurt" in the same sentence strongly indicates that the textual feedback including that sentence is likely related to the topic of "physical altercation." Thus, the feedback engine 220 can use semantic analysis to avoid false positives that may occur when analyzing words individually without linguistic context.

The machine learning engine 230 determines safety scores for providers of network system 100 using different types of classifiers. Using the feature vectors generated by the feedback engine 220 to characterize textual feedback and/or associated metadata, the machine learning engine 230 trains classifiers having different types of safety risk (e.g., "vehicle operation" or "interpersonal behavior"). The machine learning engine 230 may implement machine learning techniques such as deep learning, logistic regression with L1 penalty (L1 regularization) or L2 penalty (L2 regularization), convolutional neural networks, or other types of dimensionality reduction processes. The classifiers generate safety sub-scores, which are aggregated as an input to an "ensemble classifier" that determines a safety score based on each of the safety sub-scores for a given provider and/or metadata.

Based on the safety score, the ensemble classifier may determine whether the provider has a "low," "medium," or "high" safety risk. In an example use case where the safety score is represented by a percentage value, a safety score under 50% is "low," a safety score from 50% to 90% is "medium," and a safety score 90% and greater is "high." If the ensemble classifier determines that the provider has a "high" safety risk, the network system 100 may take action to mitigate the safety risk and prevent future safety incidences from occurring. For example, the network system 100 communicates a warning message via a client device 110 of the provider, or suspends the account of the provider for a certain duration of time, or notifies an administrator of the network system 100 to further review the provider and the feedback.

In other embodiments, the ensemble classifier determines a binary output (which may be based on the safety score), for instance, whether the provider is safe or not safe. In some embodiments, the ensemble classifier determines that a provider is not safe in response to determining that one or more of the safety sub-scores is greater than a threshold value. For example, even if the provider has a "low" safety sub-score for "vehicle operation," if the provider has a "high" safety sub-score for "interpersonal behavior" greater than the threshold value, the ensemble classifier may determine that the provider is unsafe. The machine learning engine 230 can train the ensemble classifier or other classifiers using information describing false positives and false negatives determined based on manual input. For example, a false positive occurs when the ensemble classifier determines that a provider is not safe, though the provider is actually safe; a false negative occurs when the ensemble classifier determines that a provider is safe, though the provider is actually not safe.

In other examples, the ensemble classifier learns a weighting or other relationship between each type of the safety sub-scores to learn and determine which combinations of sub-scores generate a sufficient overall safety score. In addition to the safety sub-scores, the ensemble classifier may also incorporate the metadata associated with the feedback to learn a relationship between the metadata, the sub-scores, and outcome safety score as discussed further herein.

III. Example Feature Vectors

Figure 3A:
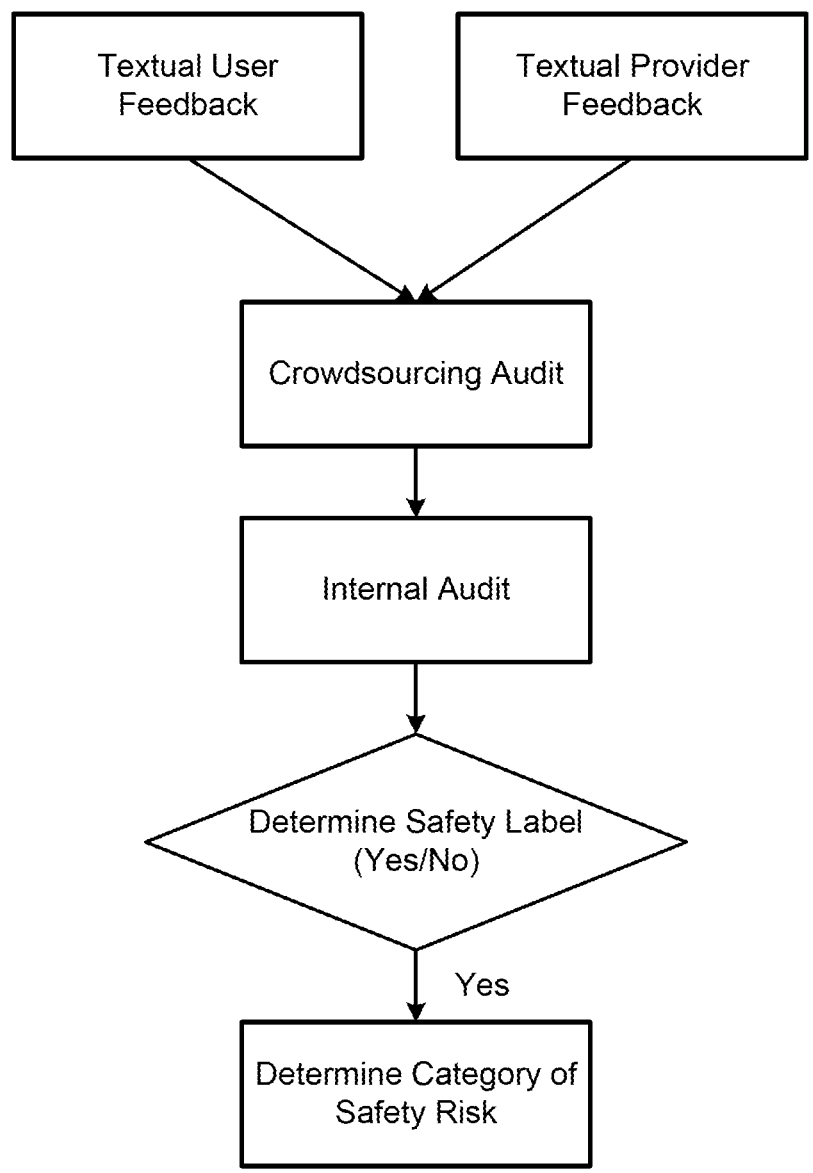
FIG. 3A is a data flow diagram for preparing training data according to one embodiment.

FIG. 3A is a data flow diagram 300 for preparing training data according to one embodiment. In this example, the training data may be supervised training data labeled manually, though in other examples the training data may be automatically labeled. The network system 100 receives textual feedback from users and providers. The network system 100 provides the textual feedback to one or more third party systems to conduct a crowdsourcing audit. A third party system may be a crowdsourcing Internet marketplace such as a Mechanical Turk, which assigns textual feedback to crowdsourcing workers (e.g., humans) who determine which textual feedback should be considered for preparing training data. For instance, the crowdsourcing workers filter out textual feedbacks that are incomplete or faulty submissions, spam, redundant, or otherwise indicative of poor quality. Additionally, the crowdsourcing workers filter out textual feedback that are determined to be unrelated to safety risk, e.g., "driver was so late," "the car had a weird smell," or "wish the driver had free water."

The network system 100 conducts an internal audit of the filtered set of textual feedback. The internal audit may be conducted by personnel of the network system 100 and thus, provide another level for filtering out textual feedback that are not useful for training classifiers for determining safety risk. In some embodiments, the crowdsourcing audit conducts a "coarse filter," while the internal audit conducts a "fine filter." In other words, the personnel of the network system 100 use more strict rules or criteria, relative to those used by the crowdsourcing workers, to determine which textual feedback to exclude or include in a filtered set. Further, the network system 100 performs the "coarse filter" before the "fine filter" because the personnel of the network system 100 may require more resources than do the crowdsourcing workers, in some embodiments.

Based on analysis of textual feedback in a filtered set, the personnel of the network system 100 determine whether to associate the textual feedback with a safety label. If so, the personnel determine a category of safety risk for the textual feedback. For example, the filtered set of textual feedback includes "driver was speeding" and "he did not obey traffic signs" labeled with the category of "vehicle operation" safety risk, as well as "rude driver" and "I wish she was friendlier" labeled with the category of "interpersonal behavior" safety risk. A textual feedback may be labeled with more than one category of safety risk. The feedback engine 220 can store the labeled textual feedback in the training data store 235. The feedback engine 220 generates feature vectors to characterize these four example textual feedback, which are further described below.

Figure 3B:
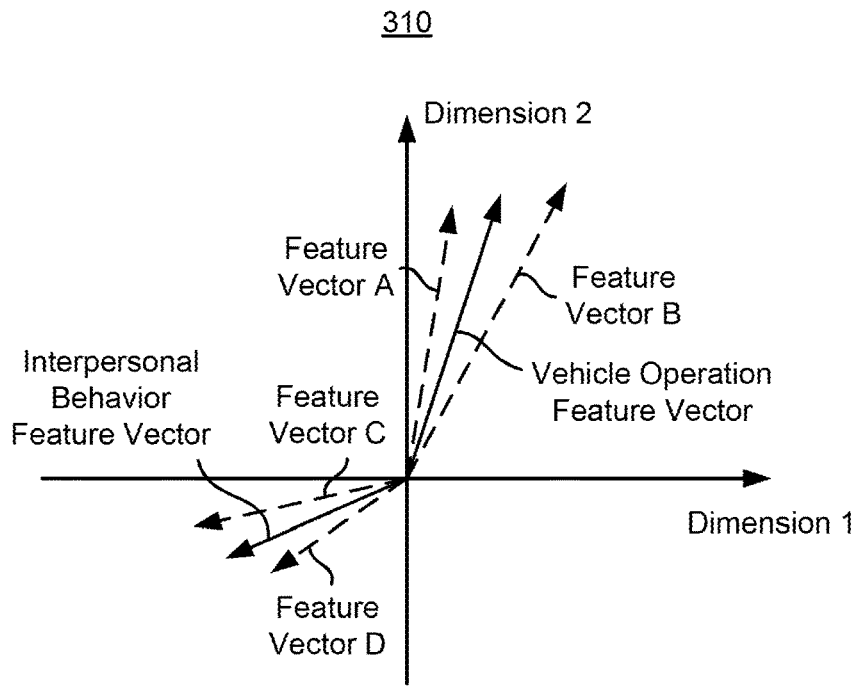
FIG. 3B is a diagram of feature vectors in latent dimension space according to one embodiment.

FIG. 3B is a diagram 310 of feature vectors in latent dimension space according to one embodiment. The example diagram 310 shown in FIG. 3A includes two dimensions for purposes of illustration, though in practice, the latent dimension space includes any number of dimensions (e.g., hundreds or thousands). Referring to the example described in FIG. 3A, the feedback engine 220 generates feature vector A and feature vector B to characterize the textual feedbacks "driver was speeding" and "he did not obey traffic signs," respectively. The feedback engine 220 generates feature vector C and feature vector D to characterize the textual feedbacks "rude driver" and "I wish she was friendlier," respectively. Relative to feature vectors C and D, feature vector A is more closely resembles feature vector B because the textual feedback "driver was speeding" is linguistically more similar to "he did not obey traffic signs," in comparison to "rude driver" and "I wish she was friendlier."

As an example, dimension 1 is correlated with words having linguistic context describing respectful interpersonal behavior. Since the textual feedback characterized by feature vectors C and D are indicative of disrespectful interpersonal behavior, feature vectors C and D have negative values in dimension 1. Additionally, dimension 2 is correlated with words having linguistic context of dangerous vehicle operation. Since the textual feedback characterized by feature vectors A and B are indicative of dangerous driving, feature vectors A and B have positive values in dimension 2. In some embodiments, the feedback engine 220 generates feature vectors that also characterize metadata in one or more dimensions.

The machine learning engine 230 trains a first classifier associated with the "vehicle operation" category of safety risk using feature vectors A and B, which are labeled with the same category of safety risk. The first classifier generates a "vehicle operation feature vector" based on feature vectors A and B, for example, a weighted average of feature vectors A and B. Similarly, using feature vectors C and D, the machine learning engine 230 trains a second classifier associated "interpersonal behavior" category of safety risk, which determines an "interpersonal behavior feature vector" based on feature vectors C and D. In some embodiments, the machine learning engine 230 can consolidate different categories of safety risk. For example, the machine learning engine 230 trains a classifier associated with a "altercation" category of safety risk using feature vectors characterizing textual feedback such as "he hit me," (an example of physical altercation) and "she was swearing" (an example of verbal altercation).

Figure 3C:
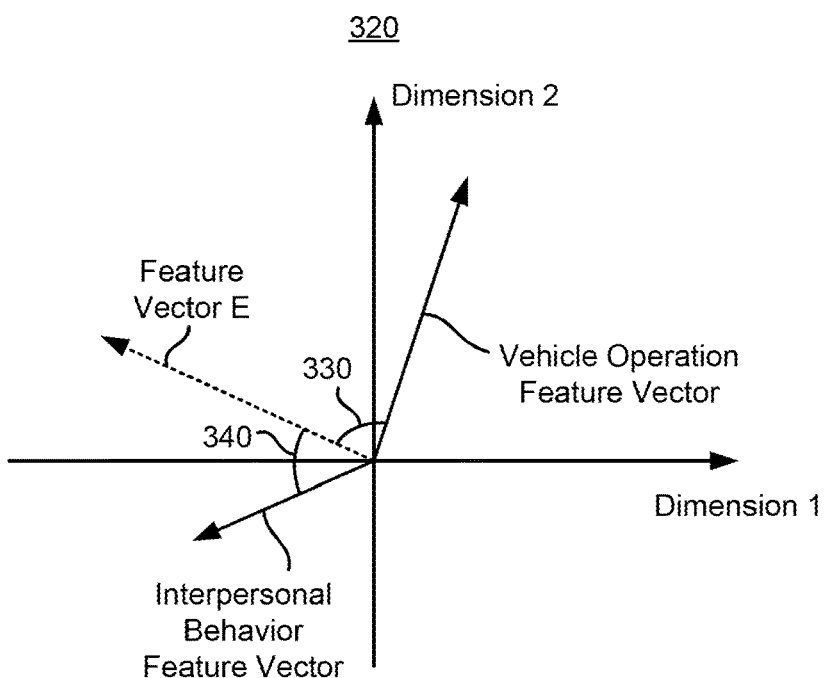
FIG. 3C is a diagram comparing the similarity of feature vectors in latent dimension space according to one embodiment.

FIG. 3C is a diagram 320 comparing the similarity of feature vectors in latent dimension space according to one embodiment. The diagram 320 includes the "vehicle operation feature vector" and the "interpersonal behavior feature vector" in the latent dimension space as shown in FIG. 3B. The machine learning engine 230 can train classifiers to determine safety sub-scores associated with different categories of safety risk. For instance, a given classifier synthesizes feature vectors to predict a safety sub-score for a given subcategory of safety risk, where the safety sub-score denotes a confidence level that classified tickets (e.g., textual feedback) belong to the given subcategory of safety risk. The classifiers may include linear type classifiers or non-linear type classifiers (e.g., based on decision-trees). In some embodiments such as the example shown in FIG. 3C, the classifiers may determine safety sub-scores based on the cosine similarity between two or more feature vectors.

As an example use case, the network system 100 receives the sample textual feedback "when I told the driver he was driving too slow, he yelled and then ignored me." The feedback engine 220 generates feature vector E to characterize the sample textual feedback. The linguistic content of the sample textual feedback includes the phrase "driving too slow" that is related to vehicle operation, as well as the phrases "he yelled" and "ignored me" that are related to interpersonal behavior. Based on a one-to-one feature vector comparison, feature vector E does not closely resemble either the vehicle operation feature vector or the interpersonal behavior feature vector because feature vector E includes linguistic content related to both of the associated categories of safety risk. Rather, feature vector E represents an aggregate (e.g., weighted average or sum) of the vehicle operation feature vector and the interpersonal behavior feature vector, in the example shown in FIG. 3C. An ensemble classifier, which is further described below, can analyze various feature vectors collectively (e.g., using feature vector E), rather than using a one-to-one feature vector comparison, to determine safety risk levels that account for different types of potential safety risk in some embodiments.

To evaluate feature vector E with respect to the different safety sub-scores, the feedback engine 220 applies feature vector E to the first classifier (associated with the "vehicle operation" category of safety risk), which in one embodiment, determines a first safety sub-score based on the cosine similarity angle 330. In addition, the feedback engine 220 applies the feature vector E to the second classifier (associated with the "interpersonal behavior" category of safety risk), which in one embodiment, determines a second safety sub-score based on the cosine similarity angle 340. In other embodiments, classifiers can determine safety sub-scores using other statistical models such as information entropy, decision tree, Pearson's correlation, or linear least squares.

IV. Example Safety Risk Classifiers

IV. A. Training Classifiers

Figure 4A:
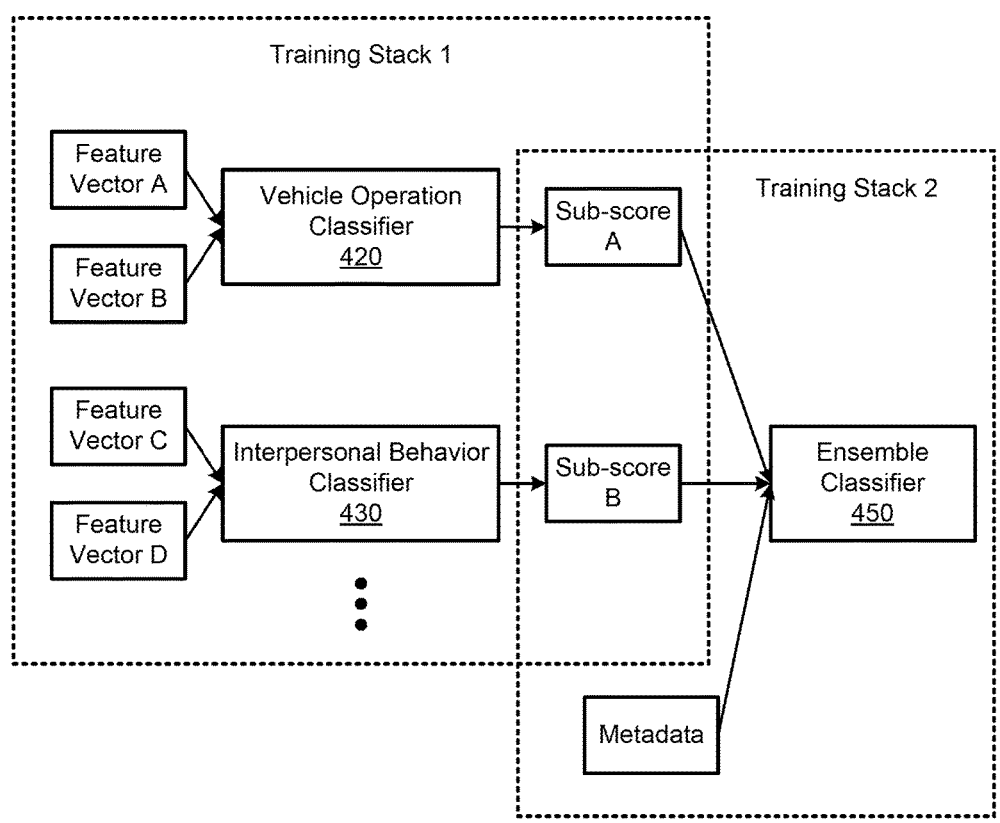
FIG. 4A is a data flow diagram for training classifiers according to one embodiment.

FIG. 4A is a data flow diagram 410 for training classifiers according to one embodiment. In "training stack 1," the machine learning engine 230 trains multiple classifiers each associated with different categories of safety risk. Referring to the example previously described with reference to FIG. 3A-C, the machine learning engine 230 trains a vehicle operation classifier 420 using feature vectors A and B, and trains an interpersonal behavior classifier 430 using feature vectors C and D. The vehicle operation classifier 420 determines safety "sub-score A" and the interpersonal behavior classifier 430 determines safety "sub-score B." Other categories of safety risk include "physical altercation," "language," "sexual harassment," or "uncomfortable environment," which may be associated with classifiers determining safety sub-scores for the corresponding category of safety risk. As discussed above, these trained classifiers may learn a feature vector for each sub-score, or may learn a score based on the feature vectors without representing the sub-score in the feature vector space, e.g., as shown in FIG. 3B. In some embodiments, "training stack 1" includes one or more classifiers associated with metadata rather than a category of safety risk. Classifiers associated with metadata may generate sub-scores based on input metadata of textual feedback.

In "training stack 2," the machine learning engine 230 trains an ensemble classifier 450 using safety sub-scores determined in "training stack 1." In some embodiments, the machine learning engine 230 also trains the ensemble classifier 450 using metadata associated with textual feedback used to derive feature vectors to train the classifiers in "training stack 1." Thus, the machine learning engine 230 can apply the metadata for training in both "training stack 1" and "training stack 2."

IV. B. Determining Safety Risk Using Trained Classifiers

Figure 4B:
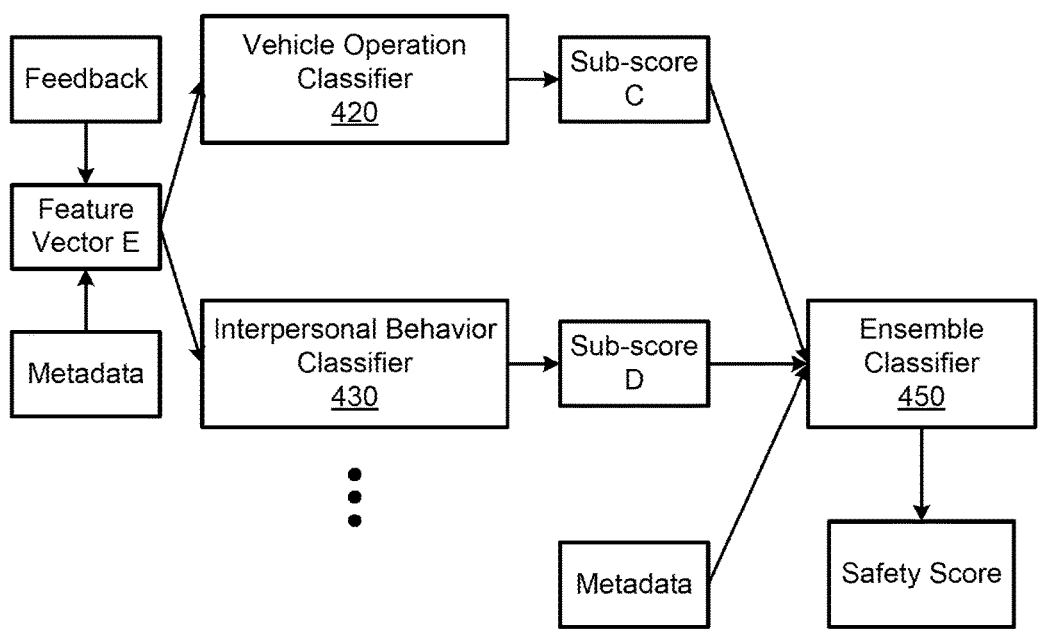
FIG. 4B is a data flow diagram for using the trained classifiers shown in FIG. 4B to determine a safety score according to one embodiment.

FIG. 4B is a data flow diagram 440 for using the trained classifiers shown in FIG. 4B to determine a safety score according to one embodiment. Referring to the previous example, the feedback engine 220 generates feature vector E to characterize the sample textual feedback "when I told the driver he was driving too slow, he yelled and then ignored me" received from a user and metadata associated with the sample textual feedback. For instance, the metadata indicates that a trip provided by the provider (e.g., the driver) for the user had a duration of one hour. Additionally, the metadata includes telematics data indicating the average speed of the provider's vehicle transporting the user, as well as harsh braking and accelerations, during different segments of the trip.

The machine learning engine 230 applies feature vector E to the vehicle operation classifier 420 and the interpersonal behavior classifier 430, which determine safety sub-scores C and D, respectively. The machine learning engine 230 applies safety sub-scores C and D, along with the metadata, to the ensemble classifier 450, which determines a safety score for the provider who is described by the sample textual feedback. The ensemble classifier may determine the safety score by aggregating the safety sub-scores C and D, which can be weighted differently.

In one use case, the safety sub-scores C and D are 50% and 60%, respectively. A greater percentage indicates a greater likelihood that the provider has a safety risk of the corresponding category, for instance. As one example, the ensemble classifier 450 applies a 10% weight to boost safety sub-score C from 50% to 55%, e.g., because the ensemble classifier 450 learns during training that dangerous vehicle operation is a greater safety risk than poor interpersonal behavior. In one example, the ensemble classifier 450 sums 55% and 60% to determine the safety score of 115% for the provider. In other examples, the ensemble classifier 450 learns a weighing for each of the sub-scores to combine the sub-scores without directly boosting a sub-score. As another example, the ensemble classifier 450 may learn a combination function for the safety sub-scores to determine the safety score without directly weighing or boosting the likely safety risk of each sub-score. For example, the ensemble classifier 450 may learn a function (e.g., through a decision tree, learned network, and/or other learned model) that combines safety sub-scores to generate a resulting safety score in the range of 0% to 100%. In other embodiments, safety sub-scores and safety scores may be represented in formats other than percentage values.

The safety score can also be determined based on the associated metadata, in some embodiments. As an example using metadata, the ensemble classifier 450 may compare the duration of the trip with reference durations of other sample trips similar to the trip of the user (e.g., information about trips taken by other users of the network system 100 retrieved from the user data store 210). These comparisons may be used to generate the features describing the metadata for the classifier. The ensemble classifier 450 determines that the duration of the trip is greater (e.g., by one standard deviation) than the average of the reference durations, which is consistent with the sentiment "driving too slow" from the sample textual feedback. Further, the ensemble classifier 450 determines that the average speed of the vehicle indicated by the telematics data is 40 miles per hour (mph) for a given segment of the trip. Based on map information from the map data store 205, the ensemble classifier 450 determines that the user was traveling on a freeway having a 65 mph speed limit during the given segment. In response to determining that the difference between the 65 mph speed limit and the average speed of 40 mph is greater than a threshold value, the ensemble classifier 450 can verify that the provider was "driving too slow." The ensemble classifier 450 may increase the safety score if the metadata is consistent with the linguistic context of the associated textual feedback. On the other hand, if the metadata is inconsistent with the linguistic context, the ensemble classifier 450 may decrease the safety score. In other words, the ensemble classifier 450 can use the metadata to verify the veracity of words and phrases in textual feedback.

As additional examples of metadata analysis, the ensemble classifier 450 may increase safety scores (more safety risk) if the provider has a number of past incidences greater than a threshold number or if the trip was provided during the night time. These characteristics of the provider's prior activity may be included in the metadata. The ensemble classifier 450 can determine that certain metadata is applicable to a classifier of a particular category of safety risk. For instance, a long duration of a trip indicates a greater likelihood that the provider was involved in a traffic accident during the trip, and thus the ensemble classifier 450 increases a weight for a safety sub-score of a classifier having an "accident" category of safety risk. The relationship between these types of metadata and safety sub-scores may be specified in the design of the ensemble classifier 450. Alternatively, the ensemble classifier 450 may learn the relationship of such types of metadata and safety sub-scores through training of the ensemble classifier 450. The ensemble classifier 450 may also identify certain routes that have a greater number of safety incidents (e.g., traffic collisions or speeding violations) based on map information from the map data store 205. The ensemble classifier 450 may decrease safety scores (less safety risk) if the provider has previously provided a number of services to users greater than a threshold number or if the trip was provided during the daytime.

V. Example Process Flow

Figure 5:
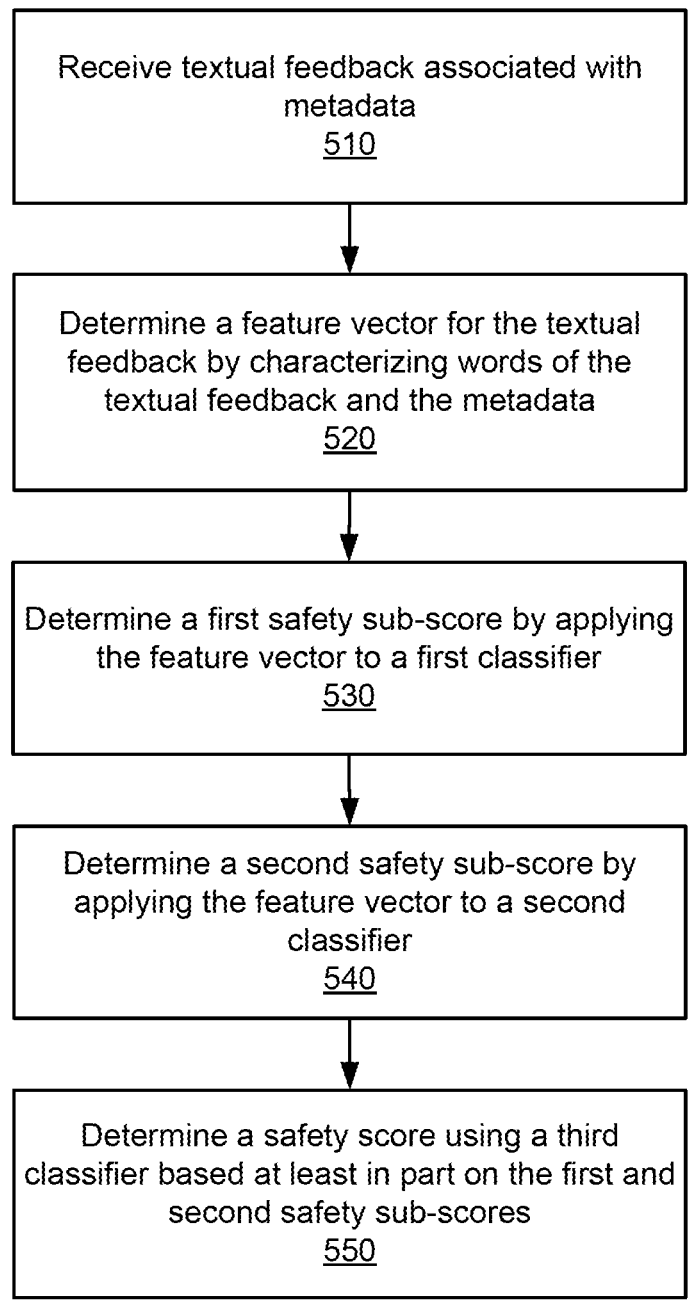
FIG. 5 is a flowchart illustrating a process for determining safety scores according to one embodiment.

FIG. 5 is a flowchart illustrating a process 500 for determining safety scores according to one embodiment. In some embodiments, the process 500 is used by the network system 100 within the system environment in FIG. 1. The process 500 may include different or additional steps than those described in conjunction with FIG. 5 in some embodiments or perform steps in different orders than the order described in conjunction with FIG. 5.

In one embodiment, the feedback engine 220 receives 510 textual feedback associated with metadata from a client device 110 of a user of the network system 100. The user inputs textual feedback for a provider, where the user receives service from the provider. The feedback engine 220 determines 520 a feature vector for the textual feedback by characterizing words of the textual feedback and the metadata. The machine learning engine 230 determines 530 a first safety sub-score by applying the feature vector to a first classifier associated with a first category of safety risk (e.g., "vehicle operation"). The machine learning engine 230 determines 540 a second safety sub-score by applying the feature vector to a second classifier associated with a second category of safety risk (e.g., "interpersonal behavior"), which can be different than the first category of safety risk. The machine learning engine 230 determines 550 a safety score using a third classifier, e.g., the ensemble classifier 450 shown in FIGS. 4A-B, based at least in part on the first and second safety sub-scores.

Determining safety scores for providers of the network system 100 using trained classifiers may be advantageous because the network system 100 can save resources by automating the process instead of conducting manual audits such as the crowdsourcing audit and internal audit previously described with reference to FIG. 3A. These systems also automate a previously subjective process by evaluators; by permitting analysis of particular sub-scores and learning relationships between the sub-scores and metadata, these systems provide an automated and effective way to account for a wide variety of feedback and metadata. Further, at large-scale, the network system 100 could receive hundreds of thousands or even millions of feedback submissions from users, which may originate from various countries and in many languages from around the world. Thus, it may be impractical or inefficient to manually determine whether each feedback indicates a safe or unsafe provider. Further, by automating the classification and safety predictions, the network system 100 can provide interventions to unsafe providers in real time, e.g., during a service that an unsafe provider is providing to a user who submitted textual feedback.

Once the classifiers of the network system 100 learn to predict safety risk using a set of training data (e.g., feature vectors for different categories of safety risk and types of metadata), the classifiers may not require additional manual user input. In some embodiments, the machine learning engine 230 can periodically re-train the classifiers with updated training data, for example, including a set of new textual feedback and metadata received from user who received service from providers after the previous training of the classifiers. Furthermore, by characterizing metadata along with textual feedback during the classifier training, the classifiers can more accurate predict safety risk, e.g., because the metadata provides context that may not be extracted from the textual feedback using natural language processing techniques.

VI. Example Physical Components of a Computer

Figure 6:
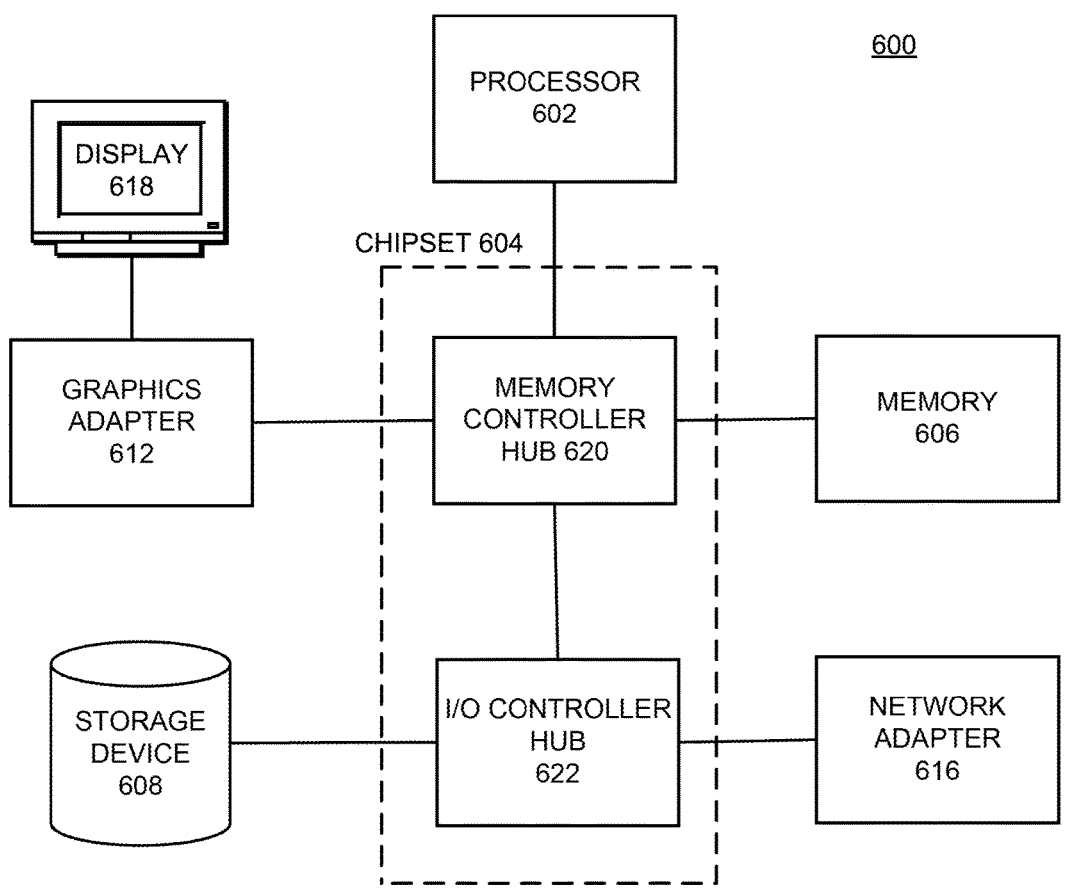
FIG. 6 is a high-level block diagram illustrating physical components of a computer used as part or all of the components from FIG. 1, according to one embodiment.

FIG. 6 is a high-level block diagram illustrating physical components of a computer 600 used as part or all of the components from FIG. 1 (e.g., the network system 100 or client devices 110), according to one embodiment. Illustrated are at least one processor 602 coupled to a chipset 604. Also coupled to the chipset 604 are a memory 606, a storage device 608, a graphics adapter 612, and a network adapter 616. A display 618 is coupled to the graphics adapter 612. In one embodiment, the functionality of the chipset 604 is provided by a memory controller hub 620 and an I/O controller hub 622. In another embodiment, the memory 606 is coupled directly to the processor 602 instead of the chipset 604.

The storage device 608 is any non-transitory computer-readable storage medium, such as a hard drive, compact disk read-only memory (CD-ROM), DVD, or a solid-state memory device. The memory 606 holds instructions and data used by the processor 602. The graphics adapter 612 displays images and other information on the display 618. The network adapter 616 couples the computer 600 to a local or wide area network.

As is known in the art, a computer 600 can have different and/or other components than those shown in FIG. 6. In addition, the computer 600 can lack certain illustrated components. In one embodiment, a computer 600 such as a server or smartphone may lack a graphics adapter 612, and/or display 618, as well as a keyboard or pointing device. Moreover, the storage device 608 can be local and/or remote from the computer 600, e.g., embodied within a storage area network (SAN).

As is known in the art, the computer 600 is adapted to execute computer program modules or engines for providing functionality described herein. As used herein, the terms "module" or "engine" refer to computer program logic utilized to provide the specified functionality. Thus, a module and/or engine can be implemented in hardware, firmware, and/or software. In one embodiment, program modules and/or engines are stored on the storage device 608, loaded into the memory 606, and executed by the processor 602.

VII. Additional Configurations

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product including a computer-readable non-transitory medium containing computer program code, which can be executed by a computer processor for performing any or all of the steps, operations, or processes described.

Embodiments of the invention may also relate to a product that is produced by a computing process described herein. Such a product may include information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
   receiving, from a client device of a user, textual feedback associated with a provider, the textual feedback including a plurality of words;
   determining a feature vector for the textual feedback by characterizing at least the plurality of words using a plurality of dimensions, each dimension of the plurality of dimensions associated with one of a plurality of categories of safety risk, the plurality of categories of safety risk including at least a first category of safety risk and a second category of safety risk different than the first category of safety risk;
   determining a first safety sub-score by applying the feature vector to a first classifier associated with the first category of safety risk, the first classifier being a machine learning model trained using a first training feature vector characterizing a first set of textual feedback associated with the first category of safety risk;
   determining a second safety sub-score by applying the feature vector to a second classifier associated with the second category of safety risk, the second classifier being a different machine learning model trained using a second training feature vector characterizing a second set of textual feedback associated with the second category of safety risk; and
   determining a safety score for the provider using the first safety sub-score and the second safety sub-score.

2. The method of claim 1, wherein the first safety sub-score denotes a confidence level that the textual feedback belongs to the first category of safety risk and the second safety sub-score denotes another confidence level that the textual feedback belongs to the second category of safety risk.

3. The method of claim 1, further comprising:
   receiving, from the client device of the user, metadata associated with the textual feedback; and
   wherein determining the feature vector for the textual feedback further comprises characterizing the metadata using the plurality of dimensions.

4. The method of claim 1, wherein determining the safety score for the provider comprises:
   determining, by a third classifier, a weighted average of the first safety sub-score and the second safety sub-score.

5. The method of claim 4, wherein determining the weighted average comprises:
   determining, by the third classifier, to boost the first safety sub-score based on a plurality of training feature vectors.

6. The method of claim 4, wherein determining the weighted average comprises:
   determining, by the third classifier, to boost the first safety sub-score by using metadata to verify veracity of the plurality of words.

7. The method of claim 6, wherein the first category of safety risk is associated with vehicle operation and the metadata includes telematics data indicating a speed of a vehicle during service provided by the provider to the user.

8. The method of claim 1, wherein the first classifier is further trained using a third training feature vector characterizing a third set of textual feedback associated with a third category of safety risk of the plurality of categories of safety risk.

9. The method of claim 1, wherein the feature vector indicates a level of linguistic similarity between the plurality of words and each of the plurality of categories of safety risk.

10. The method of claim 1, further comprising:
    providing an intervention for presentation on another client device of the provider based on the safety score.

11. A computer program product comprising a non-transitory computer readable storage medium having instructions encoded thereon that, when executed by one or more processors, cause the one or more processors to:
    receive, from a client device of a user, textual feedback associated with a provider, the textual feedback including a plurality of words;
    determine a feature vector for the textual feedback by characterizing at least the plurality of words using a plurality of dimensions, each dimension of the plurality of dimensions associated with one of a plurality of categories of safety risk, the plurality of categories of safety risk including at least a first category of safety risk and a second category of safety risk different than the first category of safety risk;
    determine a first safety sub-score by applying the feature vector to a first classifier associated with the first category of safety risk, the first classifier being a machine learning model trained using a first training feature vector characterizing a first set of textual feedback associated with the first category of safety risk;
    determine a second safety sub-score by applying the feature vector to a second classifier associated with the second category of safety risk, the second classifier being a different machine learning model trained using a second training feature vector characterizing a second set of textual feedback associated with the second category of safety risk; and
    determine a safety score for the provider using the first safety sub-score and the second safety sub-score.

12. The non-transitory computer readable storage medium of claim 11, wherein the first safety sub-score denotes a confidence level that the textual feedback belongs to the first category of safety risk and the second safety sub-score denotes another confidence level that the textual feedback belongs to the second category of safety risk.

13. The non-transitory computer readable storage medium of claim 11, having further instructions that when executed by the one or more processors cause the one or more processors to:
    receive, from the client device of the user, metadata associated with the textual feedback; and
    wherein determining the feature vector for the textual feedback further comprises characterizing the metadata using the plurality of dimensions.

14. The non-transitory computer readable storage medium of claim 11, wherein determine the safety score for the provider comprises:
    determine, by a third classifier, a weighted average of the first safety sub-score and the second safety sub-score.

15. The non-transitory computer readable storage medium of claim 14, wherein determine the weighted average comprises:
    determine, by the third classifier, to boost the first safety sub-score based on a plurality of training feature vectors.

16. The non-transitory computer readable storage medium of claim 14, wherein determine the weighted average comprises:

determine, by the third classifier, to boost the first safety sub-score by using metadata to verify veracity of the plurality of words.

17. The non-transitory computer readable storage medium of claim 16, wherein the first category of safety risk is associated with vehicle operation and the metadata includes telematics data indicating a speed of a vehicle during service provided by the provider to the user.

18. The non-transitory computer readable storage medium of claim 11, having further instructions that when executed by the one or more processors cause the one or more processors to:
provide an intervention for presentation on another client device of the provider based on the safety score.

19. A system comprising:
one or more processors; and
a computer program product comprising a non-transitory computer readable storage medium having instructions encoded thereon that, when executed by the one or more processors, cause the one or more processors to:
receive, from a client device of a user, textual feedback associated with a provider, the textual feedback including a plurality of words;
determine a feature vector for the textual feedback by characterizing at least the plurality of words using a plurality of dimensions, each dimension of the plurality of dimensions associated with one of a plurality of categories of safety risk, the plurality of categories of safety risk including at least a first category of safety risk and a second category of safety risk different than the first category of safety risk;
determine a first safety sub-score by applying the feature vector to a first classifier associated with the first category of safety risk, the first classifier being a machine learning model trained using a first training feature vector characterizing a first set of textual feedback associated with the first category of safety risk;
determine a second safety sub-score by applying the feature vector to a second classifier associated with the second category of safety risk, the second classifier being a different machine learning model trained using a second training feature vector characterizing a second set of textual feedback associated with the second category of safety risk; and
determine a safety score for the provider using the first safety sub-score and the second safety sub-score.

20. The system of claim 19, wherein determine the safety score for the provider comprises:
determine to boost the first safety sub-score based on a plurality of training feature vectors; and
determine, by a third classifier, a weighted average of the boosted first safety sub-score and the second safety sub-score.

* * * * *